Patented May 25, 1937

2,081,802

UNITED STATES PATENT OFFICE

2,081,802

MANUFACTURE OF LIGHT CONCRETE

Karl Ivar Anders Eklund, Malmo, Sweden

No Drawing. Application December 31, 1934, Serial No. 760,018. In Sweden November 15, 1933

3 Claims. (Cl. 25—155)

The invention concerns a method of manufacturing a light concrete from Portland cement aggregates and expansion materials.

A special form of concrete product is the light concrete, a product which is made highly porous by a process creating artificially a high porosity especially by gas development in consequence of a reaction between a suitable metal powder and water. It is possible to reduce in this manner the weight per unit of volume of such concrete products and to increase in this way the heat insulation. A method is already known according to which the concrete is mixed in the usual manner and the mass produced from the prepared mixture of cement and water, possibly with aggregate, is left to indurate in the open air. Besides that it has been already proposed to add finely crushed ashes obtained when burning limestone with bituminous slate as fuel to the cement and to leave this mixture to indurate. According to a third proposal a raw mixture is produced from lime, slate ashes and accelerating material, this mixture is then subjected to a process of creating porosity and the finely shaped bodies are steam indurated.

The result of all these proposals of manufacturing are unsatisfactory. Although by the process of creating a high porosity it is possible to reduce the weight per unit of volume, all known types of light concrete show a considerable shrinkage, which—strange to say—does not even stop after very long storing, as well as a low strength, crack forming and other disadvantages.

Surprisingly a way has been found which succeeds in avoiding the hitherto known disadvantages and which makes it possible to produce especially a light concrete which shows no shrinkage of practical importance. This material is also distinguished by a high constancy of volume together with a high mechanical strength, and an extraordinary strength against corrosion.

The new method is characterized by the fact that such an amount of very finely divided siliceous material is added to the raw mass to be prepared from cement, water, aggregates and gas generating expansion materials, that the lime of the cement is completely transformed into hydrated monocalcium silicate during the steam induration applied for the hardening of the concrete.

The induration of the concrete bodies is effected by means of steam, preferably induration with steam under a pressure of, for instance 5–15 kg./cm.$^2$ during a period of 5–20 hours.

Special importance must be laid on the fine grinding of the additional material containing silicic acid if these materials are not finely divided in their natural state. The siliceous material should be so finely graded as to pass a sieve of 10,000 meshes per square centimeter, that is about 250 meshes per linear inch. In choosing silicic acid material to be used, raw materials of greatest possible purity are to be preferred. Especially suitable are very pure sand, quartzite and the like. The so-called puzzolana such as trass, slag and the like are less favorable. Relatively the best results were attained up to the present time using very finely crushed pure sand. In this way bodies are produced which have the highest constancy of volume and highest strength together with comparatively low weight.

On the other hand clay, especially raw clay is advantageous. Less favorable is clay which has been subjected to a heat treatment such as for instance burnt clay or tile powder.

The proportion of the addition of siliceous material is of special importance. I have found that the hardening of cement takes place in a completely different way when steam is used instead of the customary hardening of the cement in the air. Using steam induration the cement gives rise to calcium silicate with a substantially lower silicic acid content than when the induration of the cement is carried out in the air. Concrete produced from cement, without the addition of very finely crushed silicic acid material by steam induration is substantially lower in quality than such produced from the same materials by induration in the air.

According to experience it seems that the most stable calcium silicic acid composition is the mono-silicate. This silicate is characterized by producing bodies of the highest cubic stability (constancy of volume), the highest mechanical strength as well as the highest resistance against corrosion.

For the use of the silicic acid containing aggregates a very fine crushing is necessary as already mentioned. Here it is recommended to carry out the very fine crushing operation by means of wet grinding. This method furnishes the most suitable product. Apparently the wet crushing increases also the capability of reaction of the silicic acid raw material.

The preparation of the raw mixture can be carried out by way of example in the following manner:

25 parts of cement are mixed with 25 parts of very finely crushed pure sand and 50 parts aggregate material such as stone powder up to 0.5 millimeter size as well as with small quantities of aluminum powder. To the mass is then added the necessary amount of water. In general this should not amount to less than 70 percent of the cement weight. A higher content of water produces a better texture of the final product and results also in a saving of the foaming material. A too high content of water usually does not weaken the mechanical strength, but increases to an undesirable extent the capacity of water absorption of the light concrete.

The mass is filled in moulds and then left untouched 4 to 12 hours. During this time the aluminum powder reacts with the water forming hydrogen, the mass increases its bulk, fills the mould completely and even rises above it. After 4 to 12 hours the mass rising above the mould is cut off and the bodies in the mould are subjected to steam induration under a pressure of for instance 8 atmospheres pressure above atmospheric pressure for a period of about 10 hours.

The temperature during the induration should be slowly increased and then be slowly reduced, because in this manner tensions in the products are avoided.

The use of aggregate is advisable, but not a necessity. If such materials are used, for instance aggregate of the quartz and rock type (in which case in general materials naturally porous are to be preferred) the particles should not exceed 0.5 millimeter in diameter lest thinner liquid masses set.

As aggregate also, crushed light concrete manufactured according to the invention can advantageously be used in coarse crushed form. In this case the observance of a certain size limit is not substantially important. Preferably the material rising above the moulds after the treatment of attaining high porosity which is cut off will be subjected also to the steam induration, granulated and in this form added to a fresh raw mixture.

The fact that such aggregate finds use in new raw mixtures creates rough outer surfaces of the light concrete upon which finishing coats and the like adhere especially well.

For the forming, one uses preferably moulds of considerable dimensions. It is advisable to divide the mass contained in the moulds into formed bodies of desired size immediately before the steam induration. In this way in a single mould for instance 6 to 10 slabs or a corresponding number of large sized blocks can be produced.

The light concrete bodies produced according to the invention show a shrinkage which per 1 meter length does not exceed 0.1 millimeter. In comparison the shrinkage of the usual gas-expanded concrete amounts to about 3 millimeters per 1 meter length.

If pure sand is used in very finely crushed state as an aggregate it is not difficult to produce bodies which may show a crushing strength of 150 kg./cm.$^2$ having a weight per unit of volume of 0.8. It may also be mentioned that weights per unit of volume of 0.2 to 0.3 can be attained with lower strength, but in most cases with sufficient strength.

Unexpectedly it has been found that hydraulic binders such as Portland cement give very different results from non-hydraulic binders such as lime, because the siliceous material is not of the puzzolana type, but consists of unburnt clay, finely crushed sand and similar materials. As an example it can be cited that a mixture of 50 percent lime and 50 percent finely crushed sand with a weight per unit of volume of 0.8 resulted in a compression strength (crushing strength) of 24 kg./cm.$^2$ after 12 hours' steam induration, whereas a mixture of 50 percent cement and 50 percent finely crushed sand under the same conditions resulted in a compression strength (crushing strength) of not less than 112 kg./cm.$^2$. This tremendous difference as to the strength depends upon the fact that the gas expanded or light concrete must have a certain strength before the steam induration in order to endure the enormous heat tensions connected with the steam induration without receiving cracks. These heat tensions can be diminished but never completely avoided by using sufficient preliminary heating.

The use of clay as a silicic acid containing aggregate is also of certain interest. One reason is, because it is an easily accessible material and the other reason because the necessary very fine crushing i. e. the complete grinding can be carried out technically with comparatively simple means and with low cost. It must be emphasized that, when using clay, a degree of highest dispersion is of special importance. If using clay, it is recommended to use it in a washed state, in which case suitable electrolytes such as alkalies are used as means of dispersion preliminary to the washing.

Using a clay material with 50 percent SiO$_2$ good results are obtained with mixtures which contain 20–60 parts cement and 80–40 parts clay. Working with a mixture of 40 parts cement and 60 parts clay resulted for instance in bodies with a weight per unit of volume of 0.7 and a compression strength (crushing strength) of 60 kg./cm.$^2$. Ordinary gas expanded concrete of the same weight showed a compression strength of 39 kg./cm.$^2$ after 28 days. It must also be mentioned that the light concrete bodies consisting of clay and cement were practically of constant volume. The induration of the bodies was carried out with steam of 12 atmospheres pressure above atmospheric. The period of induration amounted to 4–8 hours.

Under certain circumstances it is advisable to add one of the usual accelerator materials, such as salts, especially chlorides, calcium salts, soluble glass, or on the other hand organic substances such as sugar materials or the like may be added to the mixture to be treated. This causes in general an increase of strength without influencing the other advantageous qualities of the products according to the invention. Calcium-chloride in quantities of 2–4 percent referred to the dry weight of cement and of silicic acid containing aggregate produces in general an increase of the compression strength of 25–30 percent. At the same time these materials allow a decrease in the period of induration.

What I claim is:—

1. In the manufacture of light-weight building material having a low shrinkage, a low hygroscopicity and containing voids of chiefly macroscopic size; the process which comprises mixing together a binder consisting substantially of Portland cement, water, and a sufficient quantity of very finely divided siliceous material to convert substantially all the calcium silicates of higher basicity present into hydrates of mono-calcium silicate, said quantity substantially equaling the weight of the Portland cement present; gas expanding said mixture to produce macroscopic voids and indurating said mixture by steam under sufficient pressure and for a sufficient length of time to produce the said conversion into said hydrates of mono-calcium silicate; said induration being capable of producing substantially the results of an induration for a period of from about 4 to 10 hours at a pressure ranging from about 10 to 12 atmospheres.

2. In the manufacture of light-weight building material having a low shrinkage, a low hygroscopicity and containing voids of chiefly macroscopic size; the process which comprises mixing together a binder consisting substantially of Portland cement, gas expanding materials, aggregate, water and a sufficient quantity of finely divided siliceous material to convert substantially all silicates of higher basicity into hydrates of mono-calcium silicate, said siliceous material substantially equalling the weight of the Portland cement present and having a fineness of the order of 250 mesh; introducing such mixture into a mold before expansion has taken place, gas expanding said mixture to produce macroscopic voids while in said mold, removing any excess material from said mold, and indurating said mixture by steam under sufficient pressure and for a sufficient length of time to produce the said conversion into said hydrates of mono-calcium silicate; said induration being capable of producing substantially the results of an induration for a period of from about 4 to 10 hours at a pressure ranging from about 10 to 12 atmospheres.

3. The process of claim 2 wherein one of the usual accelerators is introduced into the mixture, thereby reducing the time required for steam induration.

KARL IVAR ANDERS EKLUND.